United States Patent
Lai et al.

(10) Patent No.: US 7,051,148 B2
(45) Date of Patent: May 23, 2006

(54) DATA TRANSMISSION SEQUENCING METHOD ASSOCIATED WITH BRIDING DEVICE AND APPLICATION SYSTEM

(75) Inventors: Jiin Lai, Taipei (TW); Chau-Chad Tsai, Taipei (TW); Chi-Che Tsai, Kaohsiung Hsien (TW); Wen-Hao Chuang, Hsinchu (TW); Chun-Yuan Su, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 826 days.

(21) Appl. No.: 10/055,558

(22) Filed: Jan. 22, 2002

(65) Prior Publication Data

US 2002/0184427 A1    Dec. 5, 2002

(30) Foreign Application Priority Data

Jun. 5, 2001    (TW) .............................. 90113546 A

(51) Int. Cl.
*G06F 13/36* (2006.01)
*G06F 13/42* (2006.01)
(52) U.S. Cl. .................. 710/310; 713/400; 713/600
(58) Field of Classification Search ................ 710/310
See application file for complete search history.

(56) References Cited

U.S. PATENT DOCUMENTS

| 5,202,969 | A | * | 4/1993 | Sato et al. ................... 711/143 |
| 5,579,530 | A | * | 11/1996 | Solomon et al. .............. 710/35 |
| 5,588,125 | A | * | 12/1996 | Bennett ...................... 710/306 |
| 5,740,373 | A | * | 4/1998 | Isaka .......................... 709/237 |
| 6,081,851 | A | * | 6/2000 | Futral et al. .................. 710/23 |
| 6,433,785 | B1 | * | 8/2002 | Garcia et al. ................ 345/531 |
| 6,460,114 | B1 | * | 10/2002 | Jeddeloh ..................... 711/120 |
| 2004/0168026 | A1 | * | 8/2004 | Wu et al. .................... 711/118 |

* cited by examiner

*Primary Examiner*—Rehana Perveen
*Assistant Examiner*—Jeremy S. Cerullo
(74) *Attorney, Agent, or Firm*—J.C. Patents

(57) ABSTRACT

A data transmission sequencing method is disclosed. A data read operation from a primary bus to a secondary bus can be executed without having to wait for the complete transfer of write data stored in posted write buffer transferring to the primary bus, as long as the secondary bus is not in use. In the mean time of the primary bus issues a read operation to the secondary bus, the secondary bus can issues write operation to the bridging device when the secondary bus is not in use. Similarly, there is no need to wait for the completion of read operation. With this type of data transmission sequencing mechanism, idle sessions in a conventional transmission sequencing method are eliminated leading to a higher data transmission rate.

20 Claims, 2 Drawing Sheets

*PS_r_a: address phase of the PS_r
*PS_r_d: data phase of the PS_r
*SP_w[3:0]: posted write cycle

*PS_r_a: address phase of the PS_r
*PS_r_d: data phase of the PS_r
*SP_w[3:0]: posted write cycle

DATA TRANSMISSION SEQUENCING METHOD ASSOCIATED WITH BRIDING DEVICE AND APPLICATION SYSTEM

CROSS-REFERENCE TO RELATED APPLICATION

This application claims the priority benefit of Taiwan application serial no. 90113546, filed Jun. 5, 2001.

BACKGROUND OF THE INVENTION

1. Field of Invention

The present invention relates to a data transmission sequencing method. More particularly, the present invention relates to a bridging device between data buses and a method for ensuring proper data transmission sequence.

2. Description of Related Art

In computer systems, a bridging device is a common piece of hardware. Various data buses are connected together by bridging devices so that data can be sent freely to various devices via the buses. For speeding up the data movement, the implement of posted write buffers are essential. Furthermore, to ensure transmission accuracy, data must be transmitted in proper sequence.

FIG. 1 is a sketch of a conventional bridging device and associated data buses. As shown in FIG. 1, the bridging device 180 of computer system is connected to at least one primary bus 100 and a secondary bus 110. A typical read/write cycle for this bridging device 180 includes a primary-to-secondary write operation 170 (PS_w), a primary-to-secondary read operation 150 (PS_r), a secondary-to-primary write operation 160 (SP_w) and a secondary-to-primary read operation 140 (SP_. In a conventional computer system, the bridging device uses a type of simple data transmission sequence to process data transfer. To process a read operation, the bridging device first checks if write data within write buffers 120 or 130 have already been transmitted. In other words, if a read operation is following a few write operations, the read operation can only be executed when all previous write data stored in the write buffer 120 or 130 have been transmitted.

FIG. 2 is a diagram showing the read/write cycles of the various buses connected to a conventional bridging device. As shown in FIGS. 1 and 2, when the secondary bus executes two write operations to transmit write data to the primary bus, a pair of posted write cycles SP_w[0] and SP_w[1] are issued on the secondary data bus. In the meantime, a primary bus to secondary bus data read request issues on the primary bus. Hence, a PS_r_a (address phase of PS_r) issues on the primary bus. To achieve proper data transmission sequence in a conventional bridging device, the bridging device suppresses subsequent actions of the secondary bus (in other words, SP_w or SP_r). Moreover, action of the PS_r must wait until all write data within posted write buffer 130 are sent to the primary bus. In other words, PS_r can be transmitted to the secondary data bus only after the posted write cycles SP_w[0] and SP_w[1] on the primary bus are issued. Consequently, the first idle time on the secondary bus can be seen.

When the read operation is transmitted to the secondary data bus, or in other words, timing the cycle PS_r is issued on the secondary bus, the second idle appears on the primary bus because the primary bus is waiting for the response data. When the bridging device transmits the response data (PS_r_d: data phase of PS_r) to the primary bus, the third idle time appears on the second bus because the secondary bus needs to wait for response data actually transmitted to the primary bus. Thereafter, secondary-to-primary bus write request is resumed. For example, posted write cycles SP_w [2] and SP_w[3] are issued on the secondary bus. In brief, this type of data transmission sequencing scheme leads to three major idle times resulting in a lowering of data transmission speed.

SUMMARY OF THE INVENTION

Accordingly, one object of the present invention is to provide a data transmission sequencing method for enhancing the data transmission rate.

To achieve these and other advantages and in accordance with the purpose of the invention, as embodied and broadly described herein, the invention provides a method for sequencing data transmission. The method comprises the steps of: recording a plurality of write data stored inside the second-to-first posted write buffer when a first-to-second bus read operation via the bridging device occurs; holding a response data obtained after executing the first-to-second bus read operation on the second bus; and continuously transmitting the response data to the first bus after transmitting the write data to the first bus.

This invention also provides a bridging device between a first bus and a second bus. The bridging device includes a posted write buffer for storing a plurality of write data transmitting from the second bus to the first bus. The bridging device further includes a hold buffer for holding a response data after executing a read operation on the second bus, and continuously transmitting the response data to the first bus after transmitting the write data, which are issued before the read operation, to the first bus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
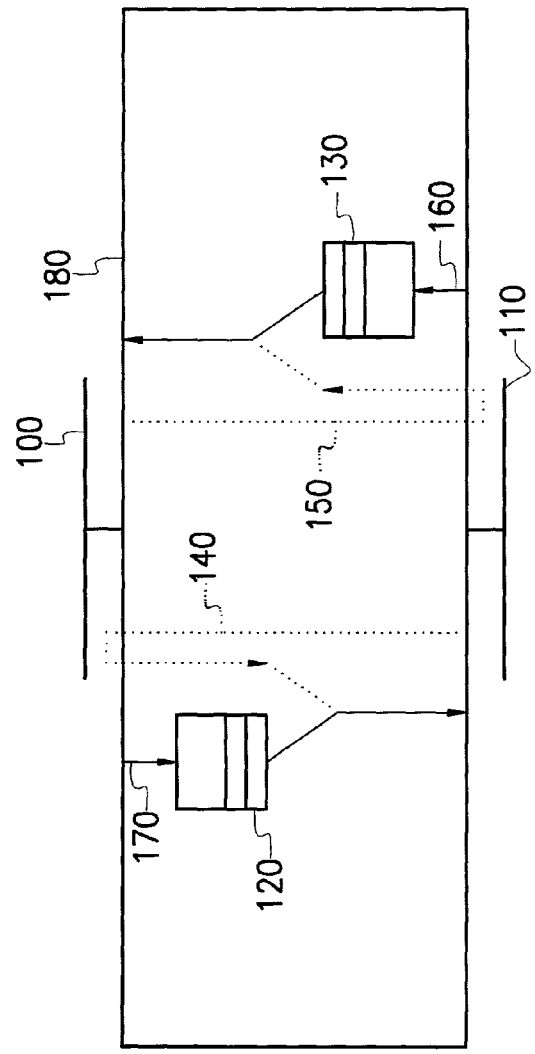
FIG. 1 is a sketch of a conventional bridging device and associated data buses.
Figure 2:
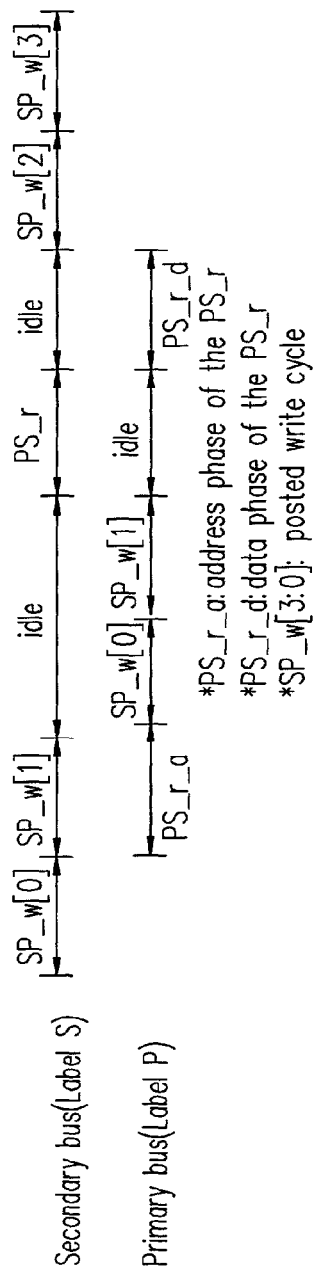
FIG. 2 is a diagram showing the read/write cycles of the various buses connected to a conventional bridging device.

Reference will now be made in detail to the present preferred embodiments of the invention, examples of which are illustrated in the accompanying drawings. Wherever possible, the same reference numbers are used in the drawings and the description to refer to the same or like parts.

Figure 3:
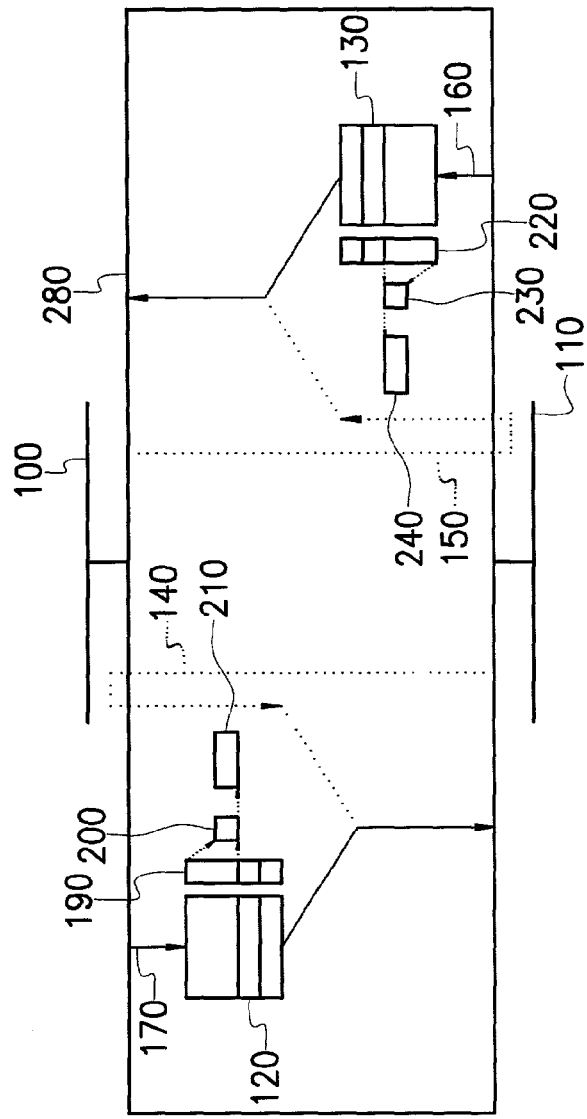
FIG. 3 is a sketch of a bridging device and associated data buses according to one preferred embodiment of this invention.

FIG. 3 is a sketch of a bridging device and associated data buses according to one preferred embodiment of this invention. As shown in FIG. 3, the bridging device 280 connects with a primary bus 100 and a secondary bus 110. The bridging device 280 also includes a secondary-to-primary posted write buffer (S-to-P Write Buffer) 130. When the primary bus 100 needs to execute a PS_r operation 150, no matter whether the S-to-P Write Buffer 130 stores write data or not, the bridging device 280 can execute the read operation when the secondary bus 110 is not in use. Afterwards, the secondary bus 110 is still permitted to execute the posted write cycles SP_w to the primary bus 100, i.e. to store write data in the S-to-P Write Buffer 130 inside the bridging device 280.

The bridging device 280 further includes a primary-to-secondary posted write buffer (P-to-S Write Buffer) 120. When the secondary bus 110 needs to execute a SP_r operation 140, no matter whether or not the P-to-S Write Buffer 120 stores write data, the bridging device 280 can execute the read operation when the primary bus 100 is not in use. Afterwards, the primary bus 100 is still permitted to execute posted write cycles PS_w to the secondary bus 110, i.e. to store write data in the P-to-S Write Buffer 120 inside the bridging device 280.

The bridging device 280 also includes a secondary-to-primary flush flag buffer (S-to-P flush flag buffer) 220 that corresponds with the S-to-P Write Buffer 130 and records its state information. The bridging device 280 farther includes a block logic for primary-to-secondary read (block logic for P to S read) 230 that monitors state information inside the S-to-P flush flag buffer 220. The bridging device 280 also has a hold buffer for primary-to-secondary read (hold buffer for P to S read) 240 for holding response data from the secondary bus 110 and receiving a control signal submitted from the block logic for P to S read 230. The S-to-P flush flag buffer 220 holds each state information inside the S-to-P Write Buffer 130. The block logic for P to S read 230 outputs a control signal to the hold buffer for P to S read 240 according to the state information so that whether to transmit response data to the primary bus 100 or not can be determined.

The bridging device 280 also includes a primary-to-secondary flush flag buffer (P-to-S flush flag buffer) 190 that corresponds to the P-to-S Write Buffer 120 and records its state information. The bridging device 280 further includes a block logic for secondary-to-primary read (block logic for S to P read) 200 that monitors state information inside the P-to-S flush flag buffer 190. The bridging device 280 also has a hold buffer for secondary-to-primary read (hold buffer for S to P read) 210 for holding response data from the primary bus 100 and receiving a control signal submitted from the block logic for S to P read 200. The P-to-S flush flag buffer 190 holds each state information inside the P-to-S Write Buffer 120. The block logic for S to P read 200 outputs a control signal to the hold buffer for S to P read 210 according to the state information so that whether or not to transmit response data to the secondary bus 110 can be determined.

If the P-to-S Write Buffer 120 transmits the write data to the secondary bus 110 in sequential order, the P-to-S flush flag buffer 190 and the block logic for S to P read 200 can be implemented using a counter. When a secondary-to-primary read request is issued, the counter may record the number of current write data existing inside the P-to-S Write Buffer 120. Moreover, the counter decreases by one after transmitting each write data to the secondary bus 110. The response data stored inside the hold buffer for S to P read 210 is transmitted to the secondary bus 110 as soon as the counter returns to zero.

If the P-to-S Write Buffer 120 transmits the write data but not necessarily in sequential order, the block logic for S to P read 200 can reproduce a content of the state information stored in P-to-S flush flag buffer 190. When a secondary-to-primary read request is issued, the block logic for S to P read 200 reproduces a content of the state information stored in the P-to-S flush flag buffer 190. After transmitting each write data to the secondary bus 110, the corresponding state information stored in the P-to-S flush flag buffer 190 is cleared. The response data stored inside the hold buffer for S to P read 210 is transmitted to the secondary bus 110 when the write data having the same content of state information stored in the P-to-S flush flag buffer 190 are all cleared.

Figure 4:
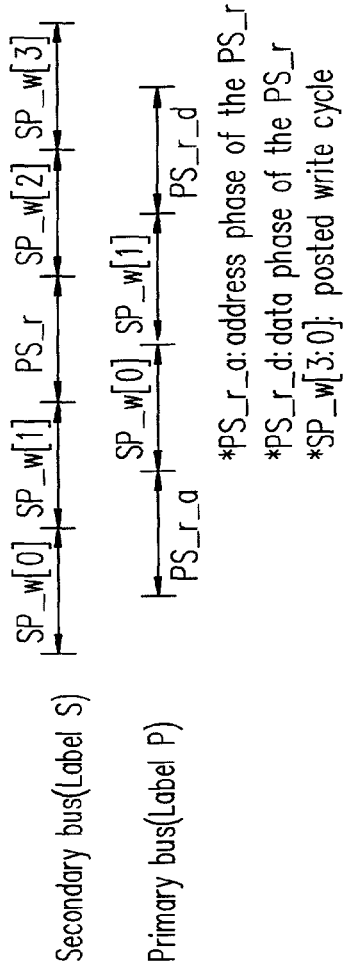
FIG. 4 is a diagram showing the read/write cycles of the various buses connected to a bridging device according to one preferred embodiment of this invention.

FIG. 4 is a diagram showing the read/write cycles of the various buses connected to a bridging device according to one preferred embodiment of this invention. As shown in FIGS. 3 and 4, if two write operations are executed from the secondary bus 110 to the primary bus 100, two posted write cycles SP-w[0] and SP_w[1] issue on the secondary bus. The write data is placed inside the S-to-P Write Buffer 130. The S-to-P flush flag buffer 220 stores two state information indicating that two write data need to be transmitted to the primary bus 100. In the meantime, a primary bus to secondary bus data read request issues on the primary bus. Hence, a PS_r_a (address phase of PS_r) issues on the primary bus.

According to this embodiment, the bridging device 280 includes the S-to-P flush flag buffer 220, the block logic for P to S read 230 and the hold buffer for P to S read 240. Hence, after transferring the two write data from the secondary bus to the S-to-P Write Buffer 130 (during the posted write cycles SP_w[0] and SP_w[1]), read request (PS_r) is immediately issued on the secondary bus 110 and the response data then is stored in the hold buffer for P to S read 240. After the PS_r_a (address phase of the PS_r) issued on the primary bus 100, two write data within the S-to-P Write Buffer 130 are transferred to the primary bus 100. The block logic for P to S read 230 monitors the state information stored in the S-to-P flush flag buffer 220. After transmitting the two write data to the primary bus 100, the block logic for P to S read 230 submits a control signal to the hold buffer for P to S read 240. Therefore, the response data stored in hold buffer for P to S read 240 is directly transmitted to the primary bus 100 (during data phase of PS_r_d).

Obviously, as long as the secondary bus 110 is not in use, the secondary-to-primary bus requests can be resumed. For example, two posted write cycles SP_w[2] and SP_w[3] may issued on the secondary bus 110. In summary, the method of sequencing data transmission used by the bridging device 280 can prevent idle sessions and hence boost data transmission rate while maintaining proper data transmission sequence. In addition, the bridging device may serve as a communication link between various types of data buses including PCI bus, AGP bus, DRAM bus and CPU bus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of sequencing data transmission inside a computer system, wherein the computer system has a bridging device, a first bus and a second bus, and the bridging device further includes a second-to-first posted write buffer, the method comprising the steps of:
- recording a plurality of write data stored inside the second-to-first posted write buffer while the bridging device executes a first-to-second bus read operation;
- holding a response data issued from the second bus after executing the first-to-second bus read operation on the second bus; and
- transmitting the response data to the first bus as soon as the write data are completely transmitted to the first bus.

2. The method of claim 1, wherein the bridging device further provides a second-to-first flush flag buffer, contents thereof including state information of the write data stored inside the second-to-first posted write buffer.

3. The method of claim 2, wherein the system further provides a block logic for first-to-second read capable of sending out a control signal according to the state information.

4. The method of claim 3, wherein the bridging device further provides a hold buffer for first-to-second read for holding the response data and transmitting the response data to the first bus according to the control signal.

5. The method of claim 1, wherein the bridging device further provides a counter for storing a sum of the write data stored inside the second-to-first posted write buffer and decreasing by one when one write data transmitting to the first bus.

6. The method of claim 5, wherein the counter sends out a control signal as soon as the counter senses that all write data are already written.

7. The method of claim 6, wherein the bridging device further provides a hold buffer for first-to-second read for holding the response data and transmitting the response data to the first bus according to the control signal.

8. A bridging device coupled to a first bus and a second bus, comprising:
- a posted write buffer for storing a plurality of write data transmitting from the second bus to the first bus; and
- a hold buffer for holding a response data issued from the second bus after executing a read operation on the second bus, and transmitting the response data to the first bus as soon as the write data, which are issued before the read operation, are completely transmitted to the first bus.

9. The bridging device of claim 8, wherein the bridging device further includes a flush flag buffer, contents thereof including state information of the write data stored within the posted write buffer.

10. The bridging device of claim 9, wherein the bridging device further includes a block logic for read, capable of sending out a control signal according to the state information.

11. The bridging device of claim 10, wherein the hold buffer transmits the response data according to the control signal.

12. The bridging device of claim 8, wherein the bridging device further includes a counter for storing a sum of the write data, which are issued before the read operation, and decreasing by one when one write data transmitting to the first bus.

13. The method of claim 12, wherein the counter sends out a control signal as soon as the counter counts to zero.

14. A data transmission sequencing system, comprising:
- a first bus;
- a second bus; and
- a bridging device, wherein after a read operation issued from the first bus to the second bus, the bridging device can hold a response data from the second bus, and the bridging device transmits the response data to the first bus as soon as a plurality of write data, which are issued before the read operation, are completely transmitted to the first bus.

15. The system of claim 14, wherein the bridging device further comprises:
- a posted write buffer for storing the write data; and
- a hold buffer for holding the response data.

16. The system of claim 15, wherein the system further includes a flush flag buffer, contents thereof including state information of the write data stored within the posted write buffer.

17. The system of claim 16, wherein the system further includes a block logic for read capable of sending out a control signal according to the state information.

18. The system of claim 17, wherein hold buffer transmits the response data according to the control signal.

19. The system of claim 15, wherein the system further includes a counter for storing a sum of the write data, which are issued before the read operation, and decreasing by one when one write data transmitting to the first bus.

20. The system of claim 19, wherein the counter sends out a control signal as soon as the counter counts to zero.

* * * * *